United States Patent
Glahn et al.

(10) Patent No.: US 6,392,320 B1
(45) Date of Patent: May 21, 2002

(54) GAS-COOLED ELECTRICAL MACHINE HAVING AN AXIAL FAN

(75) Inventors: Joern Glahn, Vernon, CT (US); Michael Jung, Waldshut (DE)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/450,727

(22) Filed: Nov. 30, 1999

(30) Foreign Application Priority Data

Dec. 3, 1998 (DE) .......................................... 198 56 456

(51) Int. Cl.[7] .................................................. H02K 9/08
(52) U.S. Cl. ........................... 310/52; 310/58; 310/59; 310/62
(58) Field of Search ................................ 310/58, 59, 62, 310/52, 57, 60 R, 60 A, 63, 64, 65

(56) References Cited

U.S. PATENT DOCUMENTS

| 1,672,680 A | * | 6/1928 | Freiburghouse | 310/57 |
| 3,254,246 A | * | 5/1966 | Philofsky | 310/55 |
| 4,039,872 A | * | 8/1977 | Armor et al. | 310/62 |
| 4,208,599 A |   | 6/1980 | Armor et al. |  |
| 4,246,503 A | * | 1/1981 | Fujioka | 310/59 |
| 5,635,779 A | * | 6/1997 | Baer et al. | 310/62 |
| 5,883,448 A | * | 3/1999 | Zimmerman | 310/52 |
| 6,097,116 A | * | 8/2000 | Hess et al. | 310/61 |

FOREIGN PATENT DOCUMENTS

| DE | 1094353 | 12/1960 |  |
| DE | 1164564 | 3/1964 |  |
| DE | 2724250 | 12/1977 |  |
| FR | 617719 | 2/1927 |  |
| JP | 53-13105 | * 2/1978 | ............ H02K/9/08 |
| JP | 57-166850 | 10/1982 |  |

* cited by examiner

*Primary Examiner*—Burton S. Mullins
(74) *Attorney, Agent, or Firm*—Burns, Doane, Swecker & Mathis, L.L.P.

(57) ABSTRACT

In a gas-cooled electrical machine having an axial fan (12a) and a downstream guidance mechanism, arranged downstream of the axial fan, in order to raise the pressure of a cooling gas, the cooling gas is driven in a forced manner by means of the axial fan from an inlet area (41), which is bounded by an inner casing (21) and a partition wall (20) arranged in the radial plane of the axial fan (12a), into an outlet area (42) which is bounded by the partition wall (20) and an outer casing (37). In this case, the downstream guidance mechanism is designed as a deflection diffusor (36) in order to deflect a cooling-gas flow (39) from an essentially axial flow direction to an essentially radial flow direction.

10 Claims, 3 Drawing Sheets

GAS-COOLED ELECTRICAL MACHINE HAVING AN AXIAL FAN

TECHNICAL FIELD

The present invention relates to a gas-cooled electrical machine having an axial fan.

BACKGROUND OF THE INVENTION

As machine utilization increases, the requirements for the cooling of rotating electrical machines become ever greater. This applies in particular to gas-cooled turbogenerators and, to an even more significant extent, to turbogenerators having an indirectly cooled stator winding. In machines of this type, all the heat losses produced in the stator winding have to be dissipated through the winding insulation into the cooled laminated stator core.

There has thus been no lack of proposals to improve the cooling, in which case one fundamental refinement of the cooling circuit has been found to be very effective, namely the change from conventional pressure cooling to suction cooling. In general, suction cooling offers the advantage over pressure cooling that the cold air which is supplied from the coolers flows directly to the cooling channels in the generator stator and generator rotor. The temperature increase produced by the machine fan can thus be completely eliminated.

With the aim of constructing turbogenerators with higher specific ratings, suction cooling is limited, however, not least by the operating conditions. Limit-rating machines are in general likewise subject to the permanent aim of increasing the unit rating, as a consequence of which the requirements for the cooling system are growing continuously. The core and driving force of the generally closed suction cooling circuit in the generator is in this case a fan which is seated on a rotor shaft and feeds the required amount of cooling flow through the branches of the cooling path system. In the case of air-cooled generators with suction cooling, a relatively large cooling volume flow is generally required with a low to medium pressure difference, in order to overcome the cooling circuit resistance. Thus, in principle, fans of an axial type are preferred. Such a generator with suction cooling has been disclosed, for example, in European Patent Application 840 426.

In accordance with fundamental flow rules, axial fans operate efficiently only provided the flow design of the inlet and outlet parts allows axial streamlined guidance in the area of the blades. Furthermore, the implementation of a downstream guidance mechanism is required for controlled pressure recovery from the high kinetic energy at the rotor outlet, in order to increase the efficiency of the fan stage or to reduce the required drive power for the fan for a given volume flow and pressure increase, since this drive power significantly influences the balance of losses in the generator.

Conventional efficiency improvement measures relating to the design of the inlet and outlet areas of axial fans generally occupy an enormous amount of space axially as is described, by way of example, in EP 682 399. However, in the case of generators having a high unit rating, the fundamental aim is to maximize the proportion of the electrically usable active partial length on the impeller length between the bearings, with the impeller length being limited for mechanical reasons and reasons related to shaft dynamics. A known combination of an impeller of the axial fan and a guide wheel with blades has the disadvantage, in addition to a disproportionately large axial space requirement, of a high noise level, which is a result of the interaction of the guide wheel blade system and the wake depressions generated upstream by the rotating impeller blades.

SUMMARY OF INVENTION

Starting from the prior art, the invention is therefore based on the object of providing an efficiently operating axial fan stage with a downstream guidance mechanism in an axial physical space which is as small as possible, in a turbogenerator having a suction cooling circuit, in a simple and economic manner.

This object is achieved according to the invention by the features of the first claim and, in particular, by a downstream guidance mechanism, arranged downstream of an axial fan, as a deflection diffusor for significantly raising the pressure and deflecting the cooling gas. With a given arrangement and subsequent installation of such a deflection diffusor, the pressure increase results in a considerable increase in the cooling volume flow while, in contrast, for a given cooling air flow, the deflection diffusor allows the power consumption of the fan to be reduced, and thus allows the efficiency of the overall electrical machine to be increased.

A particularly advantageous refinement of the invention is distinguished by the fact that the deflection diffusor comprises a diffusor funnel and a diffusor wall, in which case the diffusor funnel is arranged on a partition wall, which separates the inlet area of the axial fan from its outlet area, in the plane of the axial fan. The diffusor wall is arranged downstream of the diffusor funnel.

Furthermore, it is particularly advantageous for the diffusor wall to be designed in an annular shape and to be arranged parallel to an outer casing of a generator.

A further preferred refinement is distinguished by the fact that the diffusor wall is designed in the shape of a conical envelope, and its outer radius is thus at a shorter distance from the outer casing than its inner radius.

Furthermore, it is particularly advantageous for a number of guide vanes to be arranged between the diffusor wall and the outer casing, in order to increase the pressure further.

Further advantageous refinements of the invention can be found in the dependent claims.

BRIEF DESCRIPTION OF THE DRAWINGS

The invention will be explained in more detail in the following text with reference to the drawing. In this case, only those elements which are essential to understanding of the invention are illustrated, schematically. In the figures.

DESCRIPTION OF THE PREFERRED EMBODIMENT

Figure 1:
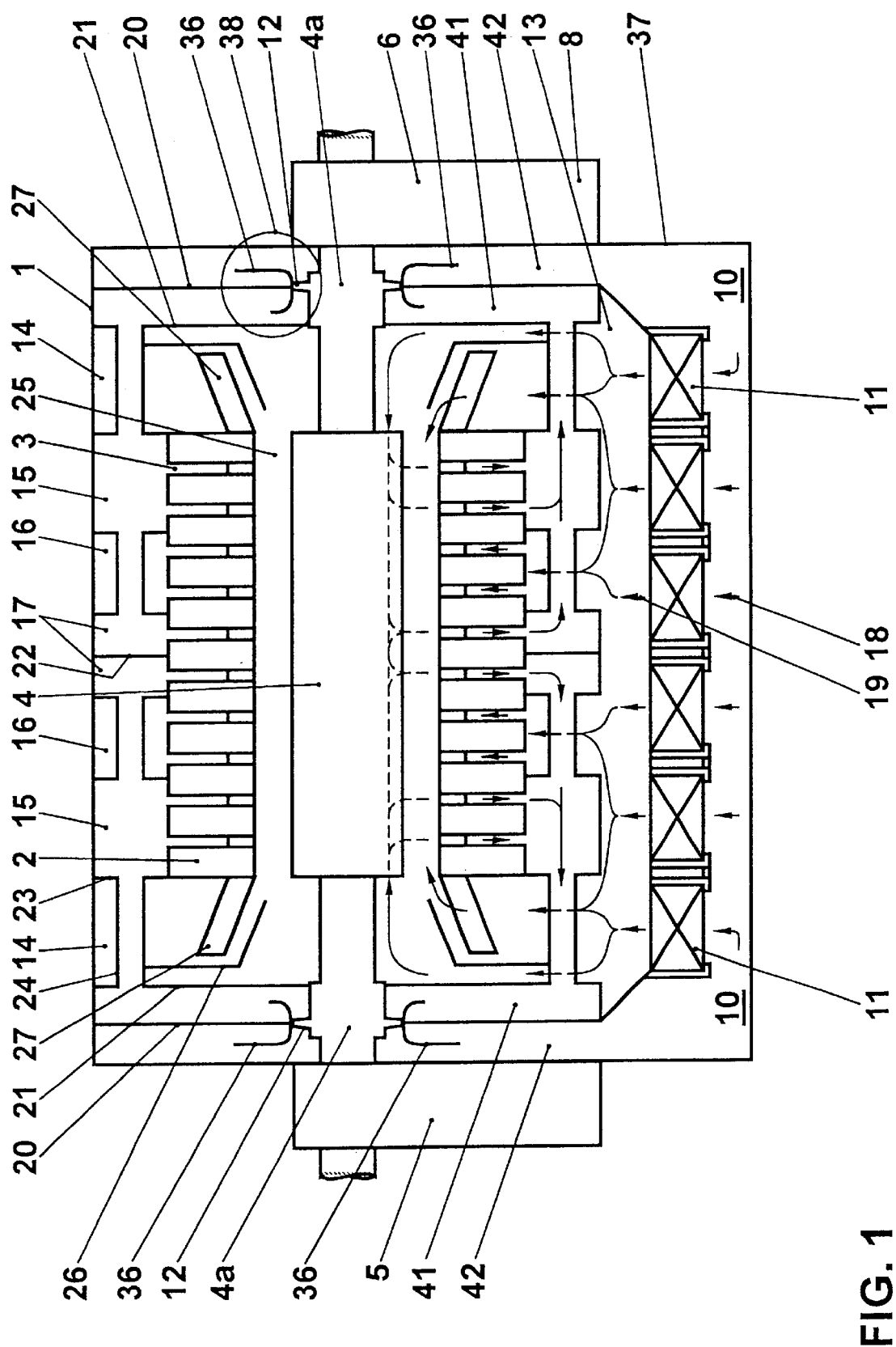
FIG. 1 shows a longitudinal section through an air-cooled turbogenerator having a deflection diffusor according to the invention in the cooling circuit.

The air-cooled turbogenerator illustrated in FIG. 1 has a machine housing 1 which encloses a laminated stator core comprising partial laminate bodies 2. Radial ventilation slits 3 are provided in the laminated stator core, between the individual partial laminate bodies 2. A rotor 4 is mounted on bearing blocks 5, 6 which are mounted on base, which is not illustrated.

A cooling arrangement for the machine is arranged in a base sump 10 in the base. This is of modular construction and, in the example, comprises six mutually identical coolers 11. In this case, the inlet openings of the coolers 11 are connected to outlet areas 42 from fans 12 arranged on both sides of the rotor 4, and the outlet openings of the coolers 11 open into an equalizing area 13. The cooling gas flowing through the coolers 11 is represented by means of arrows, in which case hot gas flowing in is denoted by 18, and cold gas flowing out is denoted by 19. All the other arrows, which are not described in any more detail, indicate the cooling circuit of the cooling gas. The cooling circuit is indicated by arrows on only one machine half, since the machine is of symmetrical construction with regard to the cooling.

The cooling principle is so-called reverse or suction cooling, in which hot gas 18 is supplied by means of fans 12 to the coolers 11. Cold gas 19 then flows from the coolers 11, through the equalizing area 13 into the machine back, that is to say the area between the machine housing 1 and the laminated stator core, which is formed from partial laminate bodies 2. In the housing back, hot and cold gas chambers 15, 17, 14 and 16 are formed by housing frames 22 and radial and axial partition walls 23, 24. In the example, there is one cold gas chamber 14 at each of the two machine ends and one hot gas chamber 17 in the machine centre, as well as in each case one hot gas chamber 15 and one cold gas chamber 16 between the chambers 14 and 17, on both sides of the vertical machine centre.

In the equalizing area 13, the cooling gas flow is distributed between the cold gas chambers 14 and 16, with partial flows being formed. A first partial flow flows between guide plates 26 and an inner casing 21 directly to the rotor 4, a second flows through the end winding 27 into the machine air gap 25, and a third cooling gas flow passes through the cold gas chambers 16 and ventilation slits 3 into the air gap 25. From the latter, the cooling gas flow is sucked by the fans 12 into an inlet area 41 between the inner casing 21 and a partition wall 20 arranged in the radial plane of each fan, and is then forced on towards the coolers 11 in the base sump 10.

In order now to satisfy the large requirement for cold gas 19 at a sufficiently high pressure in limit-rating machines, the outlet areas 42 on both sides of the rotor 4 are equipped, according to the invention, with deflection diffusers 36. These deflection diffusers 36 allow significant controlled pressure recovery, downstream of the fans 12, from the high kinetic energy of the hot gas 18. This pressure recovered from the hot gas 18 allows more efficient cooling of the turbogenerator, since the complicated cooling gas paths described above can now be fed with more coal gas 19 through the stator and the rotor per unit time. Thus, for a given fan arrangement and subsequent installation of such a deflection diffuser, it is possible to achieve a considerable increase in the cooling volume flow due to the pressure increase while, in contrast, the power consumption of the fan for a given cooling air flow is reduced with the aid of the deflection diffuser, and the efficiency of the overall electrical machine is thus increased.

Furthermore, the axial length of the rotor 4 between the bearing blocks remains the same in comparison to a conventional generator, although the deflection diffuser according to the invention now provides increased cooling, and the unit rating of the generators can be increased.

Figure 2:
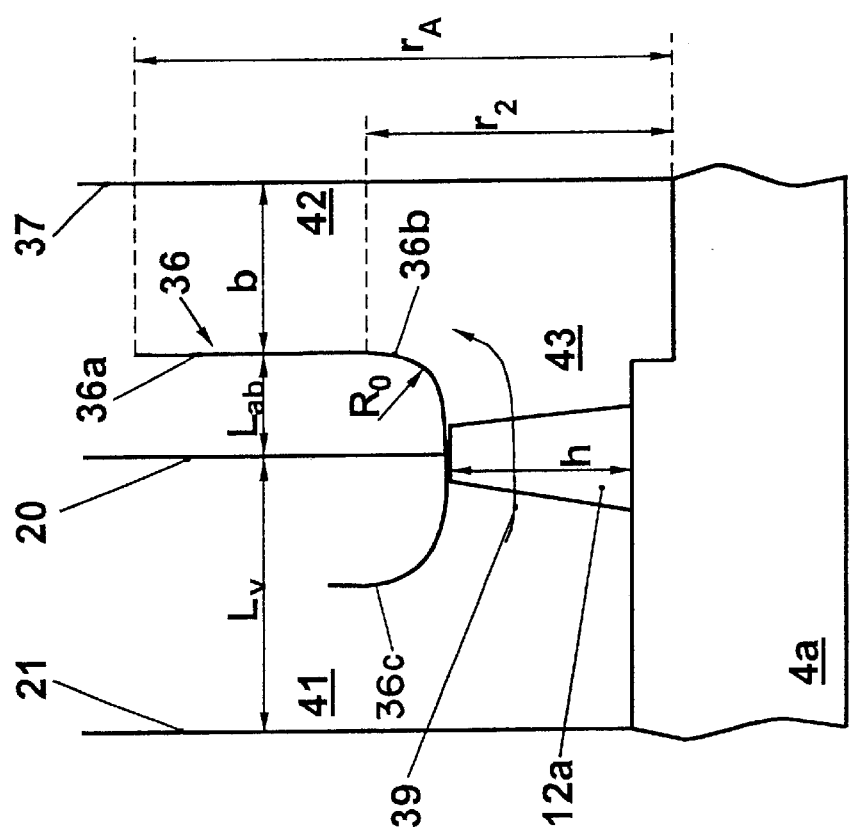
FIG. 2 shows an enlarged view of the detail 38 from FIG. 1.

FIG. 2 uses the detail 38 from FIG. 1 to show the deflection diffuser 36, comprising a diffuser funnel 36b mounted on the partition wall 20, and a diffuser wall 36a arranged on it. This diffuser wall 36a is aligned radially and is arranged at a distance b from an outer casing 37 of the turbogenerator. The outer casing 37 is designed in an annular shape and has an inner radius r2 and an outer radius rA, and, furthermore, is at a distance Lab from the partition wall 20.

The diffuser funnel 36b has a funnel radius R0 and bounds between itself and a rotor shaft 4a of the rotor 4 (FIG. 1) a flow channel 43 for a cooling gas, which cooling gas is symbolized by the flow arrow 39. The height of the flow channel 43 is denoted by h, which equally corresponds roughly to the height of the impeller blades 12a of the fan 12 (FIG. 1). The inlet area 41 has a width LV and is bounded between the partition wall 20 and an inner casing 21 arranged upstream of the fan blades 12a.

The deflection diffusor 36 further comprises a funnel wall 36c located upstream of fan blades 12a. The wall 36c forms an upstream guidance mechanism for deflecting a cooling gas flow from a radial flow direction to an axial flow direction.

Optimum pressure recovery from the kinetic energy which the cooling gas absorbs as it passes through the fan 12 is obtained for the following boundary conditions:

(1.) the funnel radius R0 is greater than 0.6 times the channel height h of the flow channel 43;

(2.) the outer radius rA of the diffusor wall 36a is less than twice its inner radius r2;

(3.) the distance b between the outer radius: rA of the diffusor wall 36a and the outer casing 37 is about 0.78 to 0.9 times the channel height h of the flow channel 43; and (4.) between the inner casing 21 and the partition wall 20, the inlet channel 41 has a width LV which is greater than 1.8 times the channel height h of the flow channel 43.

The following numerical example indicates typical pressure recovery by means of the deflection diffusor according to the invention:

In an air-cooled 300 MVA 50 Hz turbogenerator, a pressure recovery of about 45% in the static pressure is obtained from the kinetic energy downstream of the fan. In this case, the cooling air volume flow has, for example, a value of 30 m$^3$/s, the channel height is about h=140 mm, the outer radius of the diffusor wall is about rA=1000 mm, and the distance between the diffusor wall and the outer casing is about b=110 mm. Furthermore, the distance between the partition wall 20 and the inner casing 21 is about LV=270 mm, the inner radius of the diffusor wall 36 is about r2=700 mm, and the funnel radius is about R0=85 mm.

It is particularly advantageous that the pressure recovery is carried out in a very small axial area in the generator housing 1. This allows the unit rating of such turbogenerators with deflection diffusers to be increased significantly, without the overall length of the machine between the bearing blocks 5, 6 increasing.

Figure 3:
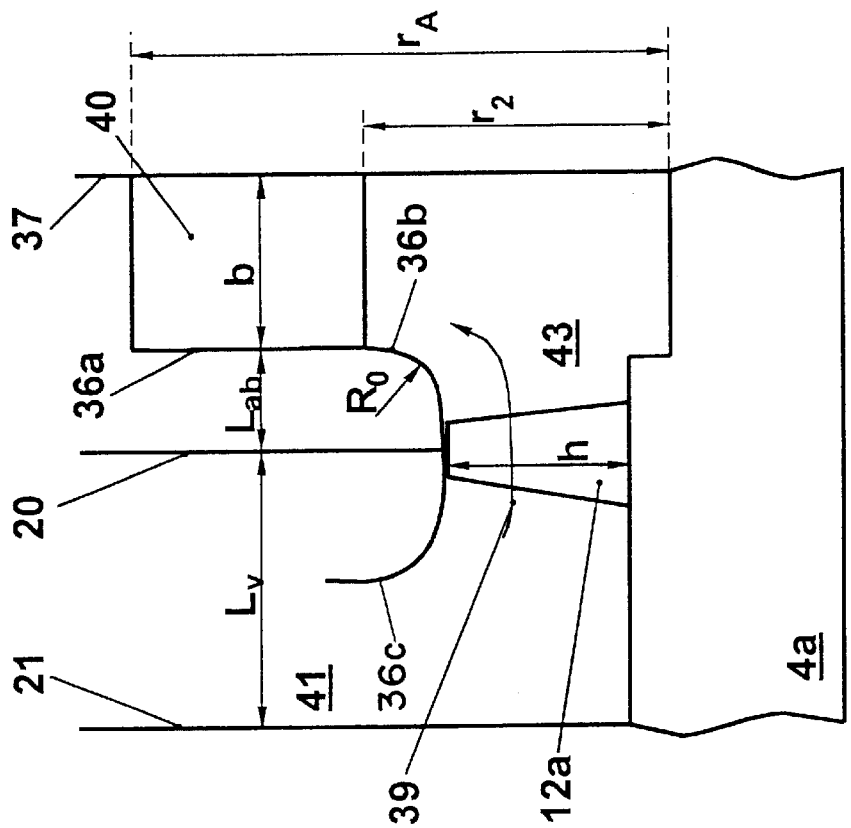
FIG. 3 shows a first design variant of the detail 38 from FIG. 1.

A first design variant of the deflection diffusor 36 according to the invention is shown in FIG. 3. A number of guide vanes 40 are arranged between the diffusor wall 36a and the outer casing 37, only one of which is shown. This number of guide vanes 40 is used for further pressure recovery from the kinetic energy of the cooling gas. In this case, the configuration and arrangement of such guide vanes 40 is within the area of knowledge of a person skilled in the art, so that detailed geometric dimensioning thereof is superfluous. It is particularly advantageous in this case that a blade system allows the radial dimensions of the diffusor wall 36 to be reduced for the same pressure recovery.

Figure 4:
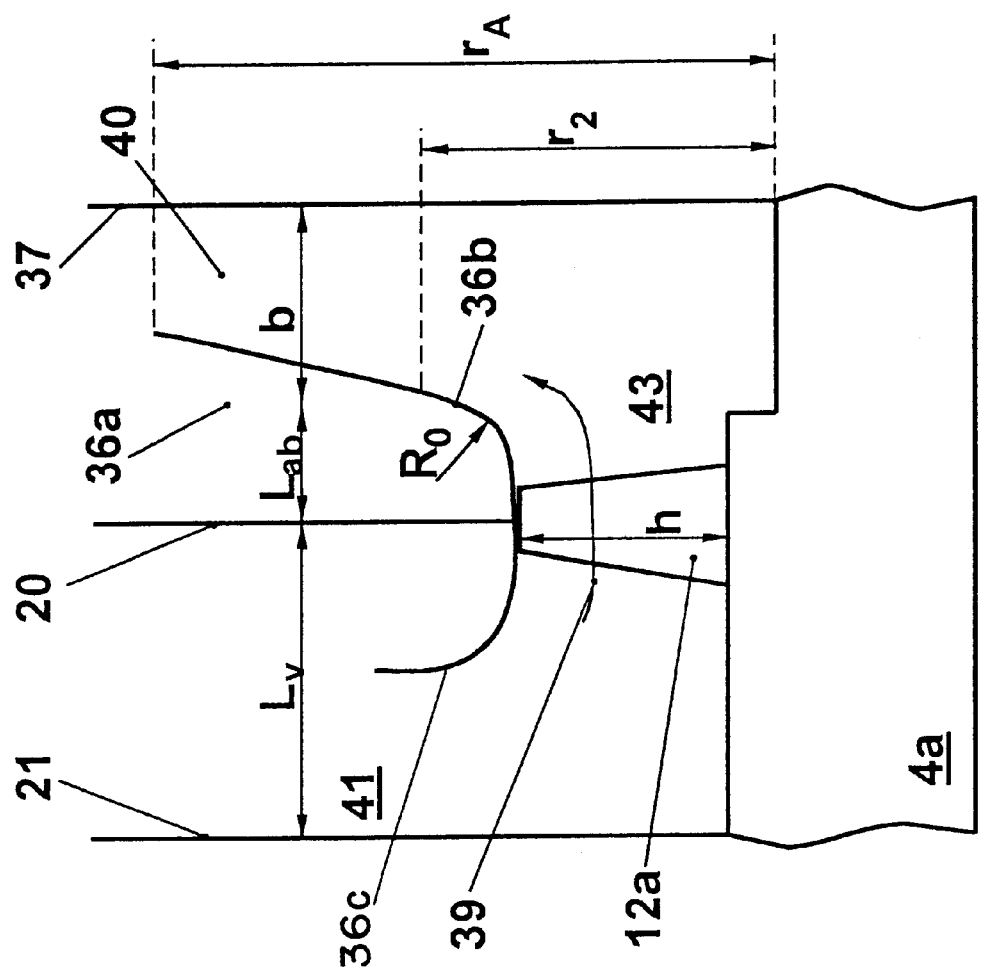
FIG. 4 shows a further design variant of the detail 38 from FIG. 1.

A further design variant of the deflection diffusor 36 according to the invention is disclosed in FIG. 4. Here, the diffusor wall 36a is designed in the shape of a conical envelope, and its outer radius rA is at a shorter distance b away from the outer casing 37 than its inner radius r2. This controlled deceleration by means of the diffusor wall in the shape of a conical envelope, and the avoidance of any flow detachment linked to this, allow the already described pressure recovery to be achieved deliberately.

The invention is in no way limited to the embodiments described here. Without departing from the idea of the invention, it is, for example, also conceivable for a combination of the diffusor wall 36a in the shape of a conical envelope (FIG. 4) and a blade system between the diffusor wall 36a and the outer casing 37 to be used for pressure recovery. Furthermore, it is conceivable for the deflection diffusor 36 according to the invention also to be used in a conventional cooling circuit with so-called pressure cooling (instead of suction cooling), or else for a special cooling gas to be used, such as helium, for example.

What is claimed is:

1. Gas-cooled electrical machine, comprising:
   an axial fan, an upstream guidance mechanism and a downstream guidance mechanism, arranged upstream and downstream of the axial fan, respectively, in order to raise the pressure of a cooling gas, in which case the cooling gas can be driven in a forced manner by means of the axial fan from an inlet area, which is bounded by an inner casing and a partition wall arranged in the radial plane of the axial fan, into an outlet area which is bounded by the partition wall and an outer casing, wherein the upstream guidance mechanism is designed as a diffusor in order to deflect a cooling gas flow from essentially a radial flow direction to an essentially axial flow direction and the downstream guidance mechanism is designed as a deflection diffusor in order to deflect a cooling-gas flow from an essentially axial flow direction to an essentially radial flow direction.

2. Gas-cooled electrical machine according to claim 1, wherein the deflection diffuser comprises a diffusor funnel and a diffusor wall, the diffusor funnel is arranged with its small funnel opening against the partition wall, and the diffusor wall is arranged on a large funnel opening of the diffusor funnel, whereby the diffusor wall has an inner radius on the large funnel opening, and furthermore the diffusor wall extends between the inner radius and an outer radius.

3. Gas-cooled electrical machine according to claim 2, wherein the diffusor wall is designed in an annular shape and is arranged parallel to the outer casing at an axial distance.

4. Gas-cooled electrical machine according to claim 2, wherein the diffusor wall is designed in the shape of a conical envelope, such that the outer radius of the diffusor wall is at a shorter distance from the outer casing then its inner radius.

5. Gas-cooled electrical machine according to claim 2, wherein the outer radius of the diffusor wall is less than twice its inner radius.

6. Gas-cooled electrical machine according to claim 2, wherein a number of guide vanes are arranged between the diffusor wall and the outer casing.

7. Gas-cooled electrical machine according to claim 2, wherein the diffusor funnel has a funnel radius, which funnel radius is greater than 0.6 times a channel height of a flow channel, which flow channel is formed between the partition wall and a rotor shaft the electrical machine.

8. Gas-cooled electrical machine according to claim 7, wherein the distance between the outer radius of the diffusor wall and the outer casing is about 0.78 to 0.9 times the channel height of the flow channel.

9. Gas-cooled electrical machine according to claim 7, wherein the inlet area between the inner casing and the partition wall has a width, in which case the width is greater than 1.8 times the channel height the flow channel.

10. Gas-cooled electrical machine according to claim 1, wherein cooling gas which has been heated is sucked outside of the partition wall by the fan.

\* \* \* \* \*